United States Patent
Kobori (10) Patent No.: US 11,590,806 B2
(45) Date of Patent: Feb. 28, 2023

(54) MOTORCYCLE TYRE FOR OFF-ROAD

(71) Applicant: Sumitomo Rubber Industries, Ltd., Kobe (JP)

(72) Inventor: Shuji Kobori, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 671 days.

(21) Appl. No.: 16/535,604

(22) Filed: Aug. 8, 2019

(65) Prior Publication Data

US 2020/0070587 A1 Mar. 5, 2020

(30) Foreign Application Priority Data

Aug. 29, 2018 (JP) .............................. JP2018-160624
Dec. 12, 2018 (JP) .............................. JP2018-232827

(51) Int. Cl.
*B60C 11/11* (2006.01)
*B60C 11/13* (2006.01)
*B60C 11/03* (2006.01)

(52) U.S. Cl.
CPC ........... *B60C 11/11* (2013.01); *B60C 11/0302* (2013.01); *B60C 11/1369* (2013.01);
(Continued)

(58) Field of Classification Search
CPC . B60C 2200/10; B60C 2200/14; B60C 11/11; B60C 11/0302; B60C 11/1369;
(Continued)

(56) References Cited

U.S. PATENT DOCUMENTS

D521,926 S * 5/2006 Matsumura .................. D12/536
D579,406 S * 10/2008 Sueishi ............... B60C 11/1369
D12/536

(Continued)

FOREIGN PATENT DOCUMENTS

| EP | 2412547 A1 | 2/2012 |
| EP | 2532537 A1 | 12/2012 |
| JP | 2016-074366 A | 5/2016 |

OTHER PUBLICATIONS

Extended European Search Report for European Application No. 19189558.0, dated Feb. 3, 2020.

*Primary Examiner* — Katelyn W Smith
*Assistant Examiner* — Philip N Schwartz
(74) *Attorney, Agent, or Firm* — Birch, Stewart, Kolasch & Birch, LLP (57) ABSTRACT

A motorcycle tyre for off-road includes a tread portion including a bottom surface and connected bodies. The block connected bodies each include blocks protruding from the bottom surface and tie-bars protruding from the bottom surface with a height smaller than that of the blocks to connect the blocks with one another. The block connected bodies include a first connected body whose blocks and tie-bars are arranged so as to surround the bottom surface at least partially. The first connected body includes a first end block located on a first end in a longitudinal direction of the first connected body and a second end block located on a second end in the longitudinal direction of the first connected body. The first end block and the second end block are adjacent with one another, and no tie-bar connecting the first end block and the second end block is provided.

21 Claims, 8 Drawing Sheets

(52) U.S. Cl.
CPC ...... *B60C 11/1376* (2013.01); *B60C 2200/10* (2013.01); *B60C 2200/14* (2013.01)

(58) Field of Classification Search
CPC ................. B60C 11/1376; B60C 11/03; B60C 2011/0337
USPC ................................................ D12/500–608
See application file for complete search history.

(56) References Cited

U.S. PATENT DOCUMENTS

| | | | |
|---|---|---|---|
| D713,327 S * | 9/2014 | Larregain | .................... D12/536 |
| 2012/0018067 A1 * | 1/2012 | Hikita | ..................... B60C 11/11 |
| | | | 152/209.8 |
| 2012/0312436 A1 * | 12/2012 | Hikita | ................... B60C 11/032 |
| | | | 152/209.1 |
| 2016/0016437 A1 | 1/2016 | Ito | |
| 2016/0101654 A1 | 4/2016 | Sueishi | |
| 2016/0250896 A1 * | 9/2016 | Ichiryu | ................... B60C 11/11 |
| | | | 152/209.12 |

* cited by examiner

Comparative Example

FIG.8

Comparative Example

MOTORCYCLE TYRE FOR OFF-ROAD

BACKGROUND ART

Field of the Disclosure

The present disclosure relates to a motorcycle tyre for off-road.

Description of the Related Art

There have been proposed motorcycle tyres for off-road which include tread portions provided with a plurality of blocks (refer to the following Patent document 1). The plurality of blocks provided on tread portions generate high grip when driving in off-road conditions.
[Patent Document]
[Patent document 1]
Japanese Unexamined Patent Application Publication 2016-74366

SUMMARY OF THE DISCLOSURE

Unfortunately, when driving in off-road conditions such as motocross, stress concentrates on base portions of the blocks and thus damage such as crack is prone to occur on the base portions.

In view of the above problems, the present disclosure has an object to provide a motorcycle tyre for off-road capable of improving durability as well as grip performance in driving off-road conditions.

In one aspect of the disclosure, a motorcycle tyre for off-road, the tyre includes a tread portion including a bottom surface and connected bodies. The block connected bodies each include blocks protruding from the bottom surface and tie-bars protruding from the bottom surface with a height smaller than that of the blocks so as to connect the blocks with one another. The block connected bodies include a first connected body whose blocks and tie-bars, in a plan view of the tread portion, are arranged so as to surround the bottom surface at least partially. The first connected body includes a first end block located on a first end in a longitudinal direction of the first connected body and a second end block located on a second end in the longitudinal direction of the first connected body. The first end block and the second end block are adjacent with one another, and no tie-bar connecting the first end block and the second end block is provided.

In another aspect of the disclosure, the first connected body may be bent in a U-shaped manner.

In another aspect of the disclosure, the first end block may be arranged on one side with respect to a tyre equator, and the second end block may be arranged on the other side with respect to the tyre equator.

In another aspect of the disclosure, the tread portion may have a designated rotation direction, the first connected body may include intermediate blocks located between the first end block and the second end block, and the first end block and the second end block may be arranged rearwardly in the rotation direction with respect to the intermediate blocks.

In another aspect of the disclosure, the tie-bars included in the first connected body may include a first tie-bar having one end connected to the first end block and a second tie-bar having one end connected to the second end block, and the first tie-bar and the second tie-bar may reduce in width continuously toward rearwardly in the rotation direction.

In another aspect of the disclosure, the intermediate blocks may include a first intermediate block adjacent to the first end block through one of the tie-bars, a second intermediate block adjacent to the second end block through one of the tie-bars, and a third intermediate block located between the first intermediate block and the second intermediate block.

In another aspect of the disclosure, the third intermediate block may be a plain block whose ground contact surface is not provided with any grooves.

In another aspect of the disclosure, the first end block, the second end block, the first intermediate block and the second intermediate block may be grooved blocks whose ground contact surfaces are provided with one or more grooves.

In another aspect of the disclosure, the block connected bodies may include a second connected body whose blocks and tie-bars, in a plan view of the tread portion, surround the bottom surface so as to define a closed area.

In another aspect of the disclosure, a number of blocks included in the second connected body may be from four to six.

In another aspect of the disclosure, the second connected body may be arranged on a location to cross a tyre equator.

In another aspect of the disclosure, the second connected body may further include two first blocks between which the tyre equator is located, and a fifth tie-bar connecting two first blocks.

In another aspect of the disclosure, the second connected body may include two second blocks located on a first side in a tyre circumferential direction of the first blocks and outwardly in a tyre axial direction with respect to the first blocks, and a sixth tie-bars connecting the second blocks and the first blocks.

In another aspect of the disclosure, at least one of the blocks included in the first connected body may be a grooved block whose ground contact surface, in a plan view of thereof is provided with a U-shaped groove, and the U-shaped groove may include two first groove elements extending from an edge of the ground contact surface and a second groove element connecting the first groove elements.

In another aspect of the disclosure, the second groove element may have a depth greater than that of the first groove elements.

In another aspect of the disclosure, the grooved block may include an auxiliary portion located inside the U-shaped groove and a main portion located outside the U-shaped groove, and the auxiliary portion may include a ground contact surface protruding outwardly in a tyre radial direction from a ground contact surface of the main portion.

In another aspect of the disclosure, a protruding height of the ground contact surface of the auxiliary portion from the ground contact surface of the main portion may be in a range of from 0.3 to 5.0 mm.

In another aspect of the disclosure, in a plan view of the tread portion, the auxiliary portion may include a ground contact edge that is aligned straight with a ground contact edge of the main portion through the first groove elements.

In another aspect of the disclosure, a surface area of the ground contact surface of the auxiliary portion may be in a range of from 0.15 to 0.45 times a surface area of the ground contact surface of the grooved block.

In another aspect of the disclosure, the block connected bodies may include a second connected body whose blocks and tie-bars, in a plan view of the tread portion, surround the bottom surface so as to define a closed area, and at least one of the blocks included in the second connected body may be said grooved block.

DESCRIPTION OF THE PREFERRED EMBODIMENTS

Figure 1:
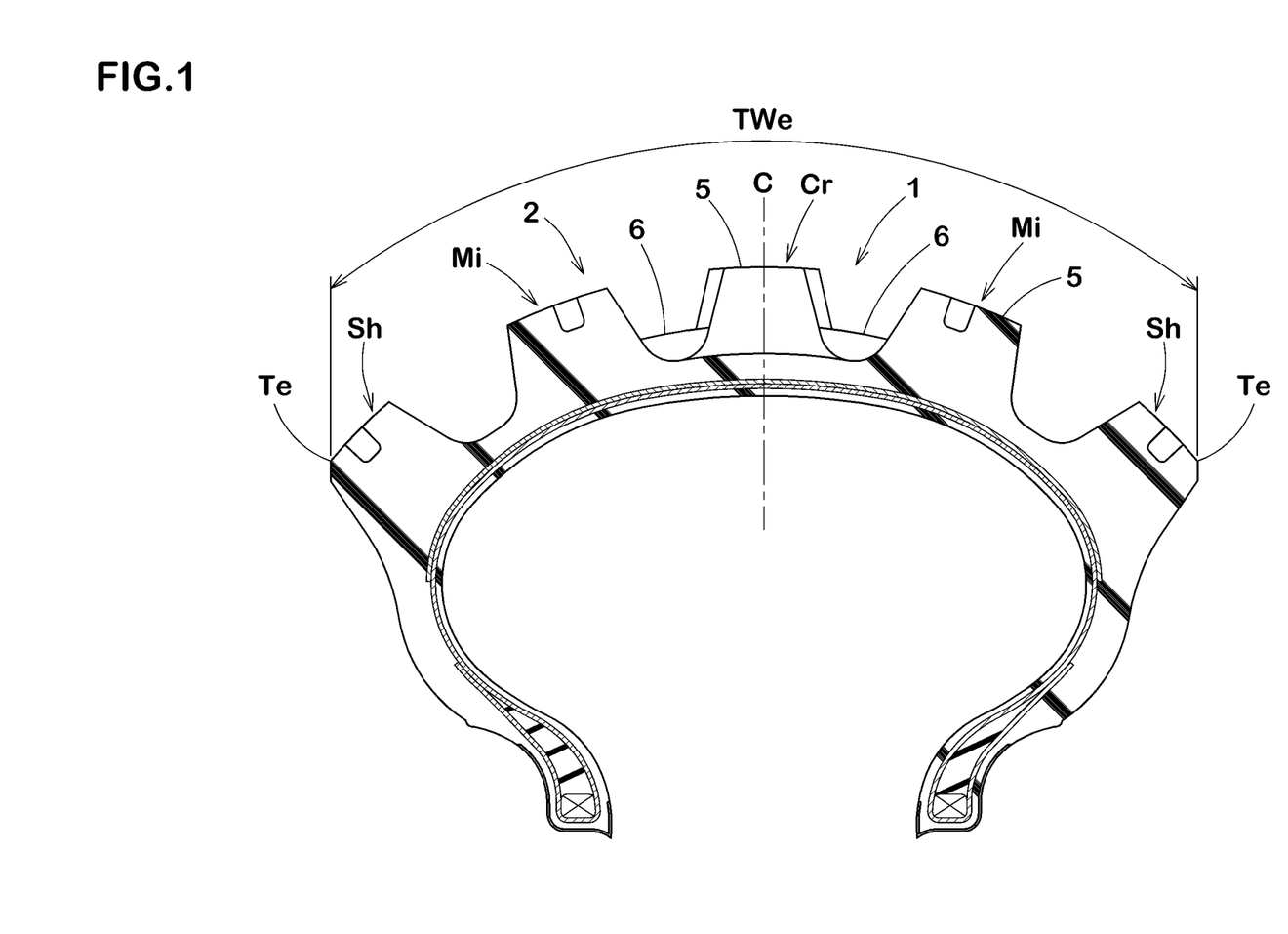
FIG. 1 is a cross-sectional view of a motorcycle tyre for off-road according to an embodiment of the disclosure.
Figure 2:
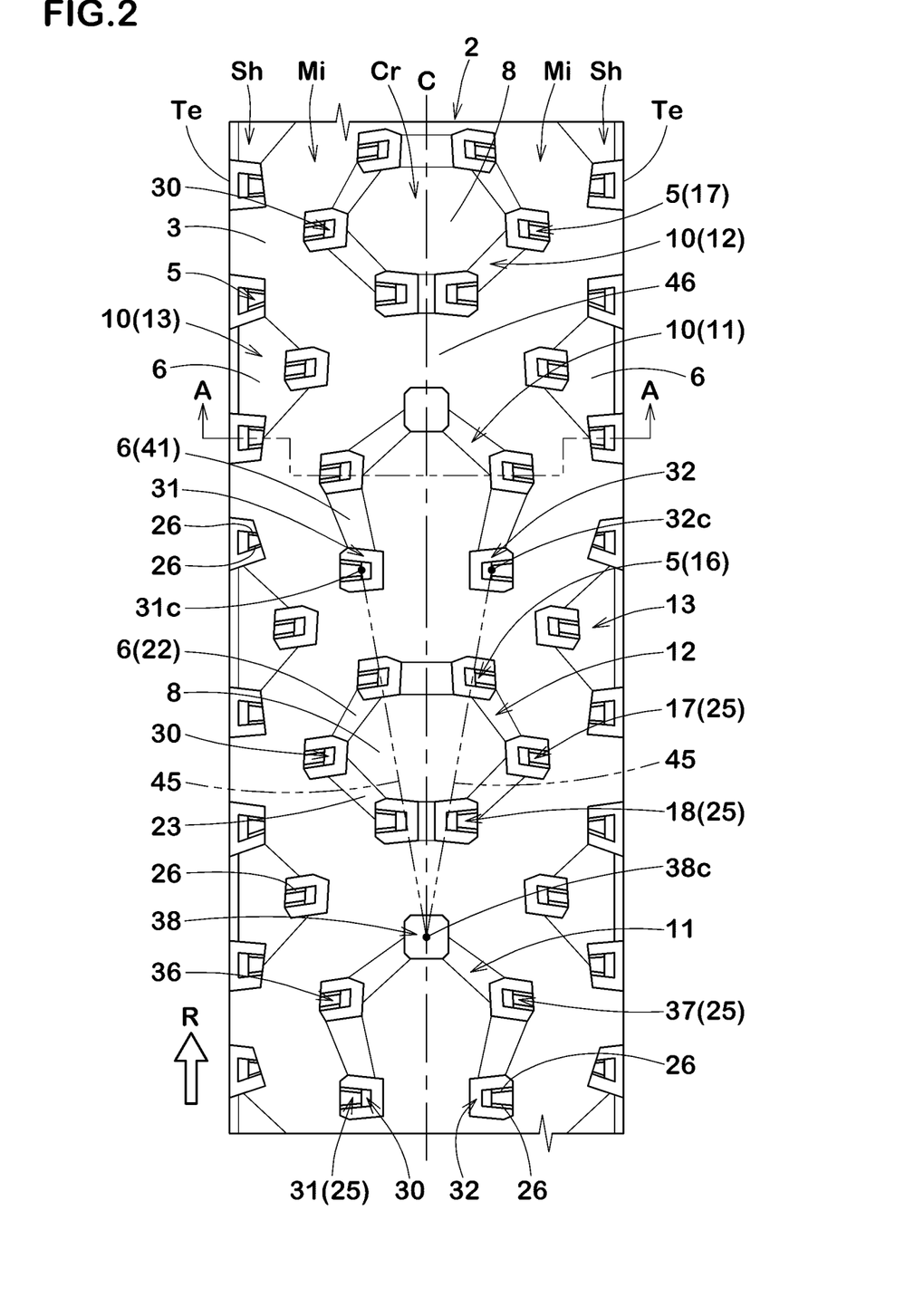
FIG. 2 is a development view of a tread portion of FIG. 1.

An embodiment of the present disclosure will be explained below with reference to the accompanying drawings. FIG. 1 is a cross-sectional view of a motorcycle tyre for off-road (hereinafter, simply referred to as "tyre") 1 under a normal state according to an embodiment of the disclosure. FIG. 2 is a development view illustrating a tread pattern of a tread portion 2 of the tyre 1. Note that FIG. 1 corresponds to a cross section taken along line A-A of FIG. 2.

As used herein, the "normal state" is such that the tyre 1 is mounted on a standard wheel rim (not illustrated) with a standard pressure but loaded with no tyre load. As used herein, dimensions of respective portions of the tyre 1 are values measured under the normal state unless otherwise noted.

The "standard wheel rim" is a wheel rim officially approved for each tyre by standards organizations on which the tyre 1 is based, wherein the standard wheel rim is the "standard rim" specified in JATMA, the "Design Rim" in TRA, and the "Measuring Rim" in ETRTO, for example.

The "standard pressure" is a standard pressure officially approved for each tyre by standards organizations on which the tyre 1 is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As illustrated in FIG. 1, the tyre 1 according to the present disclosure, for example, is suitably used for motocross. The tyre 1 according to the embodiment, for example, is suitably used for front wheel of motocross motorcycle. Note that the present disclosure is not limited to such an aspect. The tread portion 2 of the tyre 1 according to the present embodiment, in a cross-sectional view of the tyre 1, has an outer surface which is curved into a circular arc shape protruding outwardly in the tyre radial direction.

The tyre 1 according to the present embodiment, for example, includes a carcass and a belt layer. As for these elements, a conventional structure may be employed.

As illustrated in FIG. 2, the tread portion 2, for example, has a directional tread pattern having a designated rotation direction R. The rotation direction R, for example, may be indicated on a sidewall portion of the tyre 1 with mark or letters.

The tread portion 2, for example, includes a crown region Cr, two middle regions Mi and two shoulder regions Sh.

The crown region Cr is defined as a region that is centered upon the tyre equator C and that has a width of one third of the tread development width TWe which is illustrated in FIG. 1. Each shoulder region Sh is a region that has a width of one sixth of the tread development width TWe from a respective one of tread edges Te toward the tyre equator C side. Each middle region Mi is a region that is located between the crown region Cr and a respective one of the shoulder regions Sh.

As used herein, the tread development width TWe is a distance in the tyre axial direction between the tread edges Te when the tread portion 2 is developed onto a plane. The tread edges Te shall mean outermost edges in the tyre axial direction of the respective blocks arranged outermost in the tyre axial direction of the tread portion 2.

The tread portion 2 includes a bottom surface 3 and a plurality of block connected bodies 10.

The block connected bodies 10 each include a plurality of blocks 5 protruding from the bottom surface 3 and tie-bars 6 protruding from the bottom surface 3 with a height smaller than that of the blocks 5 so as to connect the blocks 5 with one another. A height of the tie-bars 6 from the bottom surface 3, for example, is in a range of from 0.07 to 0.80 times a height of the blocks 5, preferably from 0.20 to 0.50 times.

The block connected bodies 10 include at least one first connected body 11 whose blocks 5 and tie-bars 6, in a plan view of the tread portion 2, are arranged so as to surround the bottom surface 3 at least partially.

Figure 3:
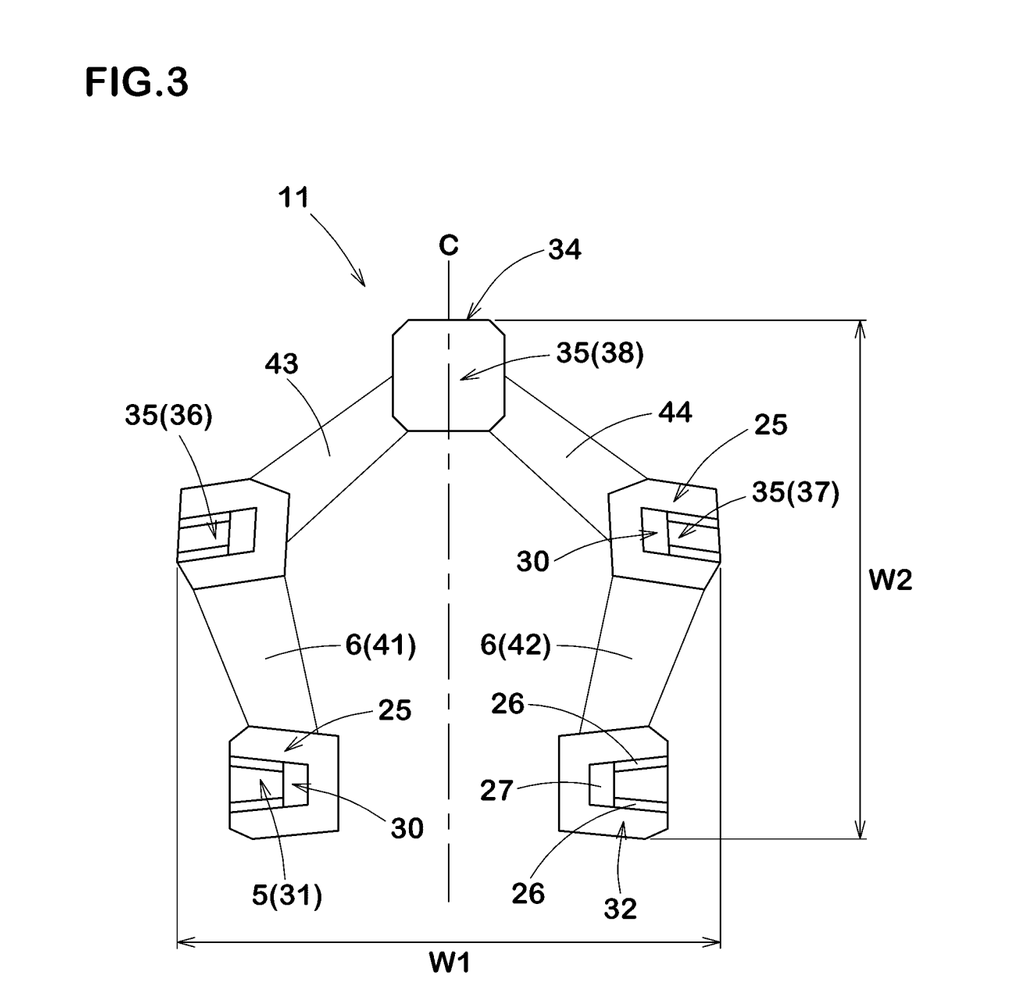
FIG. 3 is an enlarged view of a first connected body of FIG. 2.

FIG. 3 illustrates an enlarged view of the first connected body 11. As illustrated in FIG. 3, the first connected body 11 includes a first end block 31 located on a first end in the longitudinal direction of the first connected body 11, a second end block 32 located on a second end in the longitudinal direction of the first connected body 11, and a group 34 of intermediate blocks 35 located between the first end block 31 and the second end block 32.

The first end block 31 and the second end block 32 are adjacent with one another. In the present embodiment, the first end block 31 and the second end block 32 are adjacent in the tyre axial direction. Specifically, a region where the first end block 31 is virtually expanded parallel to the tyre axial direction overlaps the second end block 32. In some preferred embodiments, the above-mentioned region of the first end block 31 overlaps the second end block 32 in a circumferential length equal to or more than 70% of a length in the tyre circumferential direction of the second end block 32.

No tie-bar 6 is provided between the first end block 31 and the second end block 32. In some preferred embodiments, the first connected body 11, for example, is curved into a U-shaped manner in a plan view of the tread portion 2.

The blocks 5 included in the first connected body 11 are connected through the tie-bars 6 with one another, thus the blocks 5 having high rigidity around its base portions, enabling to exert superior durability. Further, when driving in mud conditions, as the first connected body 11 surrounds the ground contact surface partially, it enables to compress mud and then shear it to generate powerful traction.

Furthermore, since no tie-bar 6 is provided between the first end block 31 and the second end block 32 of the first connected body 11, mud compressed in a space enclosed by the first connected body 11 can be discharged smoothly, enabling to exert superior grip performance for a long period.

Preferably, at least one of the blocks 5 included in the first connected body 11 is a grooved block 25 whose ground contact surface is provided with a groove. In the present embodiment, the grooved block 25 include the ground contact surface provided with a U-shaped groove 30. The U-shaped groove 30 includes two first groove elements 26 extending from an edge of the ground contact surface and a second groove element 27 connecting the first groove elements 26. The grooved block 25 can exert superior grip performance owing to edges of the first groove elements 26 and the second groove element 27. Further, the grooved block 25 tends to deform in various directions due to ground contact pressure change, and therefore the first connected body 11 can facilitate to discharge mud compressed therein. Note that the detail structure of the grooved block 25 will be described later.

The first end block 31 and the second end block 32 are arranged on one side in the tyre circumferential direction with respect to the intermediate blocks 35. In the present embodiment, the first end block 31 and the second end block 32 are preferably arranged rearwardly in the rotation direction R with respect to the intermediate blocks 35. Thus, mud can be discharged easily through a gap between the first end block 31 and the second end block 32, improving the above-mentioned result further.

Preferably, the first connected body 11, for example, is arranged on a location to cross the tyre equator C. In some more preferred embodiments, the first connected body 11 is configured as a symmetrical shape with respect to the tyre equator C. Such a first connected body 11 can exert superior grip performance when straight traveling. Note that the first connected body 11 is not limited to the above aspect.

A length W1 in the tyre axial direction of the first connected body 11, for example, is in a range of from 0.45 to 0.65 times the tread development width TWe. A length W2 in the tyre circumferential direction of the first connected body 11, for example, is in a range of from 0.90 to 1.00 times the length W1. Note that the lengths W1 and W2 are measured in the development view of the tread portion 2.

The first connected body 11, for example, includes three or more blocks 5. In some preferred embodiments, the number of blocks 5 included in the first connected body 11, for example, is from three to seven, more preferably from four to six. The first connected body 11 according to the present embodiment has five blocks 5 which include the first end block 31, the second end block 32 and three intermediate blocks 35.

In the present embodiment, the plurality of intermediate blocks 35 includes a first intermediate block 36, a second intermediate block 37 and a third intermediate block 38. The first intermediate block 36 is arranged on one side with respect to the tyre equator C. The second intermediate block 37 is arranged on the other side with respect to the tyre equator C. The third intermediate block 38 is arranged between the first intermediate block 36 and the second intermediate block 37.

The first intermediate block 36 and the second intermediate block 37 are preferably arranged in the middle regions Mi. Note that "a block is arranged in a region" shall mean that the center of figure of the ground contact surface of the block is located within the region. In the present embodiment, the first intermediate block 36 and the second intermediate block 37 are arranged on the respective locations such that these blocks 36 and 37 define the maximum length W1 of the first connected body 11.

The center of figure of the ground contact surface of first intermediate block 36 is located outwardly in the tyre axial direction with respect to the center of figure of the ground contact surface of first end block 31. Further, in the development view of the tread portion 2, the first intermediate block 36 is arranged so as to overlap a region where the first end block 31 is expanded parallel to the tyre circumferential direction.

The center of figure of the ground contact surface of second intermediate block 37 is located outwardly in the tyre axial direction with respect to the center of figure of the ground contact surface of second end block 32. Further, in the development view of the tread portion 2, the second intermediate block 37 is arranged so as to overlap a region where the second end block 32 is expanded parallel to the tyre circumferential direction.

In the present embodiment, in the development view of the tread portion 2, a region where the first intermediate block 36 is expanded parallel to the tyre axial direction overlaps the second intermediate block 37 at least partially. In some preferred embodiments, the above-mentioned region of first intermediate block 36 overlaps the second intermediate block 37 in length in the tyre circumferential direction being equal to or more than 70% of a length in the tyre circumferential direction of the second intermediate block 37.

The tie-bars 6 include a first tie-bar 41 having one end connected to the first end block 31 and a second tie-bar 42 having one end connected to the second end block 32. The first tie-bar 41 connects the first end block 31 with the first intermediate block 36. The first tie-bar 41 extends from the first end block 31 to the first intermediate block 36 with an inclination with respect to the tyre circumferential direction. The first tie-bar 41 according to the present embodiment decreases in width from the first intermediate block 36 to the first end block 31 continuously. That is, the first tie-bar 41 decreases in width continuously toward rearward in the rotation direction R. Such a first tie-bar 41 can facilitates deformation of the first end block 31 appropriately, thus suppressing mud clogging in the first connected body 11.

The second tie-bar 42 connects the second end block 32 with the second intermediate block 37. The second tie-bar 42 extends from the second end block 32 to the second intermediate block 37 with an inclination with respect to the tyre circumferential direction. The second tie-bar 42 according to the present embodiment decreases in width from the second intermediate block 37 to the second end block 32 continuously. That is, the second tie-bar 42 decreases in width continuously toward rearward in the rotation direction R.

The third intermediate block 38, for example, is arranged in the crown region Cr. In some preferred embodiments, the third intermediate block 38 according to the present embodiments is arranged on the tyre equator C.

The third intermediate block 38, for example, is located forwardly in the rotation direction R with respect to the first intermediate block 36 and the second intermediate block 37. Thus, the third intermediate block 38 defines a forward end portion of the first connected body 11.

A third tie-bar 43 is provided to connect the first intermediate block 36 and the third intermediate block 38. The third tie-bar 43, for example, decreases in width from the first intermediate block 36 to the third intermediate block 38 continuously. Such a third tie-bar 43 can help to exert superior grip performance in a long period by preventing mud from clogging in the first connected body 11.

Similarly, a fourth tie-bar 44 is provided to connect the second intermediate block 37 and the third intermediate block 38. The fourth tie-bar 44, for example, decreases in width from the second intermediate block 37 to the third intermediate block 38 continuously.

The third intermediate block 38 according to the present embodiment, for example, is configured as a plain block whose ground contact surface is not provided with any grooves. Thus, the third intermediate block 38 can dig into the ground deeply, helping to exert superior grip performance.

Preferably, the first end block 31, the second end block 32, the first intermediate block 36 and the second intermediate block 37 are configured as grooved blocks 25 whose ground contact surfaces are provided with grooves.

As illustrated in FIG. 2, the block connected bodies 10 may include at least one second connected body 12 whose blocks 5 and tie-bars 6, in a plan view of the tread portion, surround the bottom surface 3 so as to define a closed area 8. The second connected body 12 according to the present embodiment, for example, includes four or more blocks 5. In the present embodiment, the second connected body 12 and the first connected body 11 are arranged alternately in the tyre circumferential direction.

It is preferable that at least one of the blocks 5 included in the second connected body 12 is the grooved block 25 as mentioned above. In the present embodiment, each block 5 included in the second connected body 12 is the grooved block 25. In some preferred embodiments, the crown region Cr is provided with at least one grooved block 25 included in the first connected body 11 and at least one grooved block 25 included in the second connected body 12.

Since the blocks 5 included in the second connected body 12 are connected by the tie-bars 6 with one another, these blocks 5 have high rigidity around its base portions, thus enabling to exert superior durability. Further, the closed area 8 surrounded by the second connected body 12, when driving in muddy conditions, can compress mud therein and then shear it, resulting in generating powerful reaction force.

Figure 4:
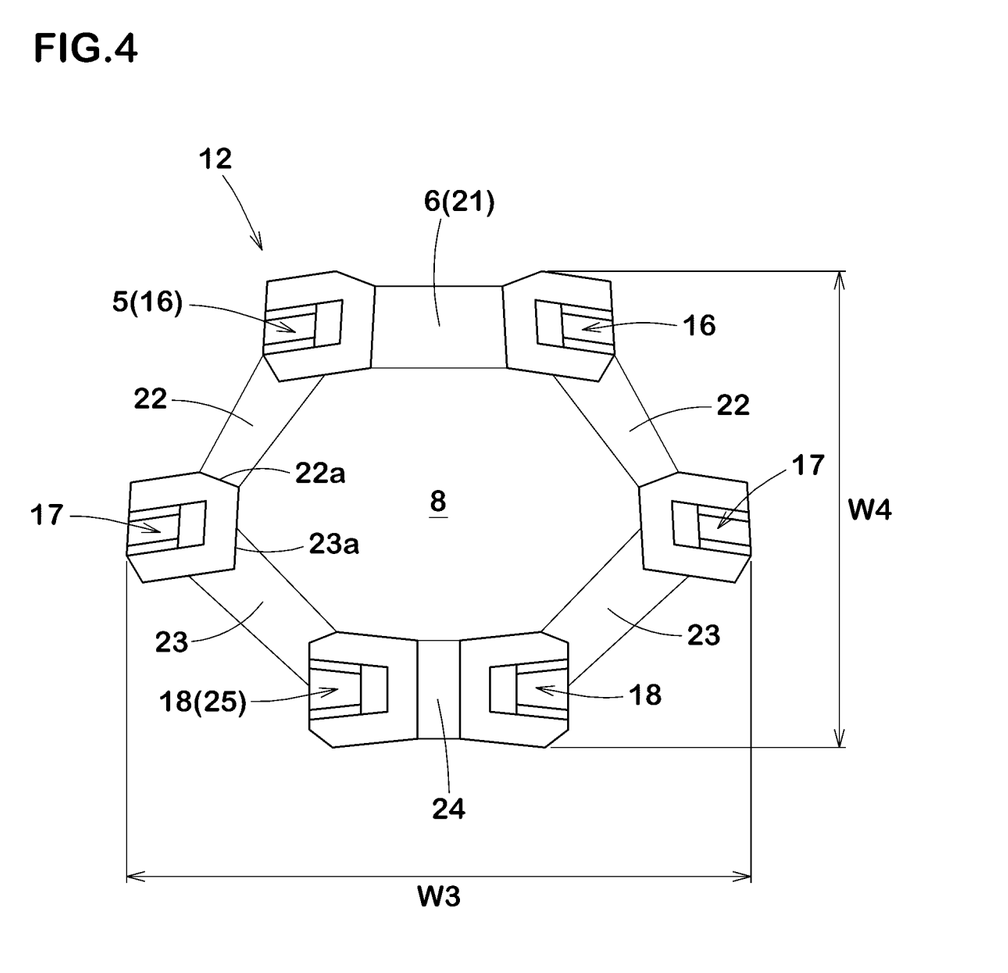
FIG. 4 is an enlarged view of a second connected body of FIG. 2.

FIG. 4 illustrates an enlarged plan view of the second connected body 12. As illustrated in FIG. 4, the second connected body 12, for example, is configured as a polygonal shape when the blocks 5 represent virtual vertexes of the polygon and the tie-bars 6 represent edges of the polygon. The number of blocks 5 included in the second connected body 12, for example, is from four to eight, preferably from four to six. The second connected body 12 according to the present embodiment is configured as a hexagonal shape which includes six blocks 5.

It is preferable that the second connected body 12, for example, is arranged on a location to cross the tyre equator C. In some preferred embodiments, the second connected body 12 is configured as a line-symmetrical shape with respect to the tyre equator C. Such a second connected body 12, when straight driving, enable to exert superior grip performance. Note that the second connected body 12 is not limited to the above aspect.

It is preferable that a length W3 of in the tyre axial direction of the second connected body 12, for example, is greater than the length W1 in the tyre axial direction of the first connected body 11. The length W3 in the tyre axial direction of the second connected body 12, for example, is in a range of from 0.50 to 0.70 times the tread development width TWe. A length W4 in the tyre circumferential direction of the second connected body 12, for example, is in a range of from 0.60 to 0.90 times the length W1. Note that the lengths W3 and W4 are measured on a development view of the tread portion 2.

The second connected body 12, for example, includes two first blocks 16, two second blocks 17, and two third blocks 18.

The first blocks 16, for example, are arranged between which the tyre equator C is located. It is preferable that the first blocks 16, for example, are arranged in the crown region Cr (FIG. 2).

In the present embodiment, a region where one of the first blocks 16 is virtually extended along the tyre axial direction overlaps the other one of the first blocks 16. In some preferred embodiments, the above-mentioned region of one of the first blocks 16 overlaps the other one of the first blocks 16 in length equal to or more than 70% of a length in the tyre circumferential direction of the other one of the first blocks 16.

A fifth tie-bar 21 is provided so as to connect two first blocks 16. The fifth tie-bar 21, for example, extends in the tyre axial direction across the tyre equator C. In some preferred embodiments, the fifth tie-bar 21 may extend in the tyre axial direction with a constant width. Such a fifth tie-bar 21 enables to improve durability of the first blocks 16 effectively.

The second blocks 17 are arranged between which the tyre equator C is located. It is preferable that each second block 17, for example, is arranged in a respective one of the middle regions Mi. In the present embodiment, two second blocks 17 are arranged so as to define a maximum axial length W3 of the second connected body 12.

In the present embodiment, a region where one of the second blocks 17 is virtually extended along the tyre axial direction overlaps the other one of the second blocks 17. In some preferred embodiments, the above-mentioned region of one of the second blocks 17 overlaps the other one of the second blocks 17 in length equal to or more than 70% of a length in the tyre circumferential direction of the other one of second blocks 17.

The second blocks 17 are arranged in one side in the tyre circumferential direction with respect to the first blocks 16. The second blocks 17 according to the present embodiment are arranged rearwardly in the rotation direction R of the first blocks 16. Further, the second blocks 17 are arranged outwardly in the tyre axial direction of the first blocks 16. In the present embodiment, regions where the second blocks 17 are virtually extended along the tyre circumferential direction do not overlap the first blocks 16.

Sixth tie-bars 22 are provided so as to connect the first blocks 16 and the second blocks 17. The sixth tie-bars 22 extend from the first blocks 16 to the second blocks 17 with an inclination with respect to the tyre circumferential direction. The sixth tie-bars 22 according to the present embodiment, for example, decrease in width from the first blocks 16 to the second blocks 17 continuously. Thus, the second blocks 17 tend to deform toward the first blocks 16, suppressing mud clogging in the closed area 8. Therefore, superior grip performance can be exerted in a long period.

The third blocks 18 are arranged between which the tyre equator C is located. In the present embodiment, a region where one of the third blocks 18 is virtually extended along the tyre axial direction overlaps the other one of the third blocks 18 at least partially. In some preferred embodiments, the above-mentioned region of one of the third blocks 18 overlaps the other one of the third blocks 18 in length equal to or more than 70% of a length in the tyre circumferential direction of the other one of the third blocks 18.

Each third block 18, for example, is arranged on the tyre equator C side with respect to each second block 17. Preferably, the third blocks 18, for example, are arranged in the crown region Cr. The third blocks 18 according to the present embodiment are arranged so as to overlap regions where the first blocks 16 are virtually extended along the tyre circumferential direction. Further, the center of figures of the ground contact surfaces of the third blocks 18 are located on the tyre equator C side with respect to the center of figures of the ground contact surfaces of the first blocks 16.

The third blocks 18 are arranged on one side in the tyre circumferential direction with respect to the second blocks 17. The third blocks 18 according to the present embodiment are located rearwardly in the rotation direction R with respect to the second blocks 17.

On each side of the tyre equator C, a seventh tie-bar 23 is provided to connect the second block 17 and the third block 18. The seventh tie-bar 23 extends from the second block 17 to the third block 18 and is inclined in an opposite direction to the sixth tie-bar 22 with respect to the tyre circumferential direction. The seventh tie-bars 23 according to the present embodiment, for example, decrease in width from the second blocks 17 to the third blocks 18 continuously. Such seventh tie-bars 23 can facilitates deformation of the third blocks 18 in the tyre circumferential direction, thus suppressing mud clogging in the closed area 8.

It is preferable that widths of the seventh tie-bars 23 at its connected portions 23a to the second blocks 17, for example, are greater than widths of the sixth tie-bars 22 at its connected portions 22a to the second blocks 17. Thus, the second blocks 17 are difficult to lay down toward rearward in the rotation direction R, leading to improved braking performance.

An eighth tie-bar 24 is provided to connect the third blocks 18. The eighth tie-bar 24, for example, extends along the tyre axial direction and across the tyre equator C. The eighth tie-bar 24 according to the present embodiment extends in the tyre axial direction with a constant width.

It is preferable that a length of the eighth tie-bar 24 in the tyre axial direction is shorter than a length in the tyre axial direction of the fifth tie-bar 21. Preferably, a width in the tyre circumferential direction of the eighth tie-bar 24 is greater than a width in the tyre circumferential direction of the fifth tie-bar 21. Such an eighth tie-bar 24 can prevent effectively two third blocks 18 from deforming, leading to improved braking performance.

As illustrated in FIG. 2, the block connected bodies 10 according to the present embodiment further include a plurality of third connected bodies 13. Each third connected body 13, for example, includes three blocks 5 which are connected by a tie-bar 6 having a triangular shape. These blocks 5 included in each third connected body 13 include two blocks 5 which are arranged in either one of the shoulder regions Sh and one block 5 arranged in the middle region Mi adjacent to the one of the shoulder regions Sh. The third connected body 13 as such can be helpful to improve grip performance when cornering.

The third connected bodies 13, for example, are located outwardly in the tyre axial direction with respect to both second connected bodies 12 and first connected bodies 11. In some preferred embodiments, each third connected body 13 overlaps a respective one of region where a respective space 46 formed between the adjacent second connected body 12 and the first connected body 11 is virtually extended along the tyre axial direction. This layout may be useful to provide riders with a linear reaction force according to increasing of a bank angle of motorcycle, leading to superior turning stability.

In the present embodiment, in a group of two forward and rearward first connected bodies 11 in the rotation direction R and the second connected body 12 arranged therebetween, when drawing virtual straight lines 45 from the center of figure 38c of ground contact surface of the third intermediate block 38 of the rearward first connected body 11 to the respective center of figures 31c and 32c of ground contact surfaces of first end block 31 and second end block 32 of the forward first connected body 11, the first blocks 16 and the third blocks 18 of the second connected body 12 are arranged on the virtual straight lines 45. Further, the virtual straight lines 45 are inclined at an angle equal to or less than 15 degrees with respect to the tyre circumferential direction, for example. Such a block layout can be useful to generate large friction force using their block edges.

Figure 5:
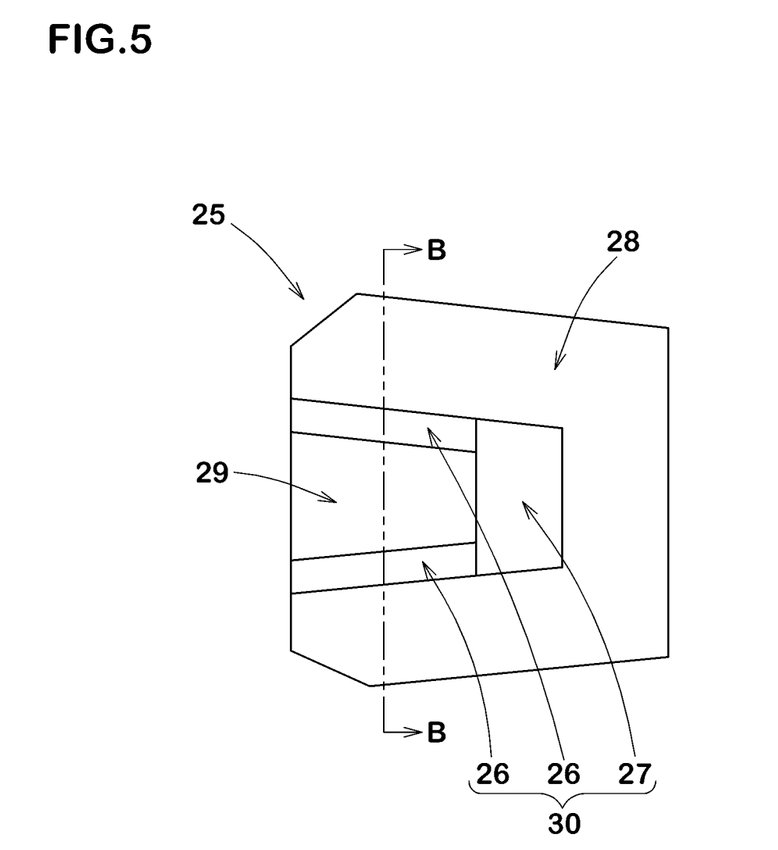
FIG. 5 is an enlarged view of a grooved block of FIG. 2.

FIG. 5 illustrates an enlarged view of one of the grooved blocks 25. Note that the grooved block 25 shown in FIG. 5 is the first end block 31 of the first connected body 11. As illustrated in FIG. 5, the grooved block 25 includes an auxiliary portion 29 located inside the U-shaped groove 30 and a main portion 28 located outside the U-shaped groove 30.

Figure 6:
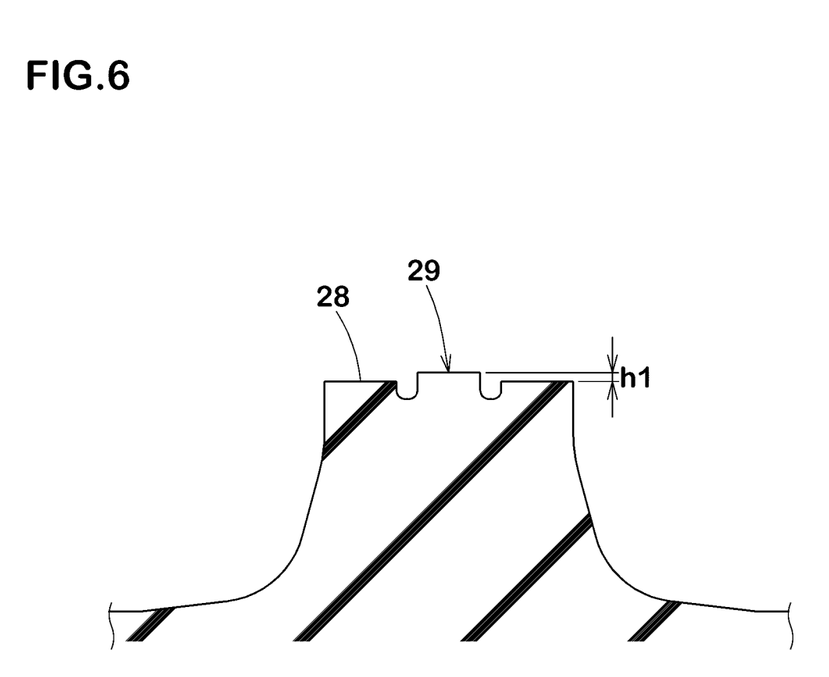
FIG. 6 is a cross-sectional view taken along line B-B of FIG. 5.

FIG. 6 illustrates a cross-sectional view taken along line B-B of FIG. 5. As illustrated in FIG. 6, the auxiliary portion 29 may preferably include a ground contact surface protruding outwardly in the tyre radial direction from a ground contact surface of the main portion 28. It is preferable that a protruding height h1 of the ground contact surface of the auxiliary portion 29 from the ground contact surface of the main portion 28 is in a range of from 0.3 to 5.0 mm, for example. Such an auxiliary portion 29, while ensuring durability of the block, can exert superior grip performance.

As illustrated in FIG. 5, a surface area of the ground contact surface of the auxiliary portion 29 is preferably in a range of from 0.15 to 0.45 times a surface area of the ground contact surface of the grooved block 25, for example. Such an auxiliary portion 29 can improve durability of the block and grip performance in a well-balanced manner.

In a plan view of the tread portion, the auxiliary portion 29 preferably includes a ground contact edge that is aligned straight with a ground contact edge of the main portion 28 through the first groove elements 26. Thus, the auxiliary portion 29 can generate large friction force in cooperation with the main portion 28.

It is preferable that a groove width of the second groove element 27 is greater than groove widths of the first groove elements 26. Specifically, the groove width of the second groove element 27 is preferably from 2.0 to 3.0 times the groove widths of the first groove elements 26. Thus, the auxiliary portion 29 tends to bend easily toward the second groove element 27. Such effect effectively suppresses that mud is held by the block connected bodies 10. From the same viewpoint, it is preferable that the second groove element 27 has a depth greater than that of the first groove elements 26. Preferably, the depth of the second groove element 27 is from 1.5 to 2.5 times the depths of the first groove elements 26. Preferably, the depth of the second groove element 27 may be from 1.8 to 2.2 mm. Note that the respective depths are measure as depths from the ground contact surface of the main portion 28.

As illustrated in FIG. 2, each of the crown region Cr, the shoulder regions Sh and the middle regions Mi is provided with at least one grooved block 25. In some preferred embodiment, grooved blocks 25 arranged in the crown region Cr and the middle regions Mi are configured such that the first groove elements 26 are opened at edges of the blocks on the tread edges Te side. In contrast to the above, the grooved blocks 25 arranged in the shoulder regions Sh are configured such that the first groove elements 26 are opened at edges of the blocks on the tyre equator C side.

Each grooved block 25 arranged in the crown region Cr and the middle regions Mi is configured such that two first groove elements 26 extend in parallel with one another, or a circumferential distance between two first groove elements 26 increases gradually toward the tread edges Te. On the other hand, each grooved block 25 arranged in the shoulder regions Sh is configured such that a circumferential distance between two first groove elements 26 decreases gradually toward the tyre equator C. Such a layout of grooved blocks 25 can be helpful to provide riders of motorcycles with preferred linear reaction force when increasing camber angle of motorcycle.

While the particularly preferable aspects of motorcycle tyre for off-road in accordance with the present disclosure have been described in detail, the present disclosure is not limited to the illustrated embodiments, but can be modified and carried out in various aspects.

Example 1

Figure 7:
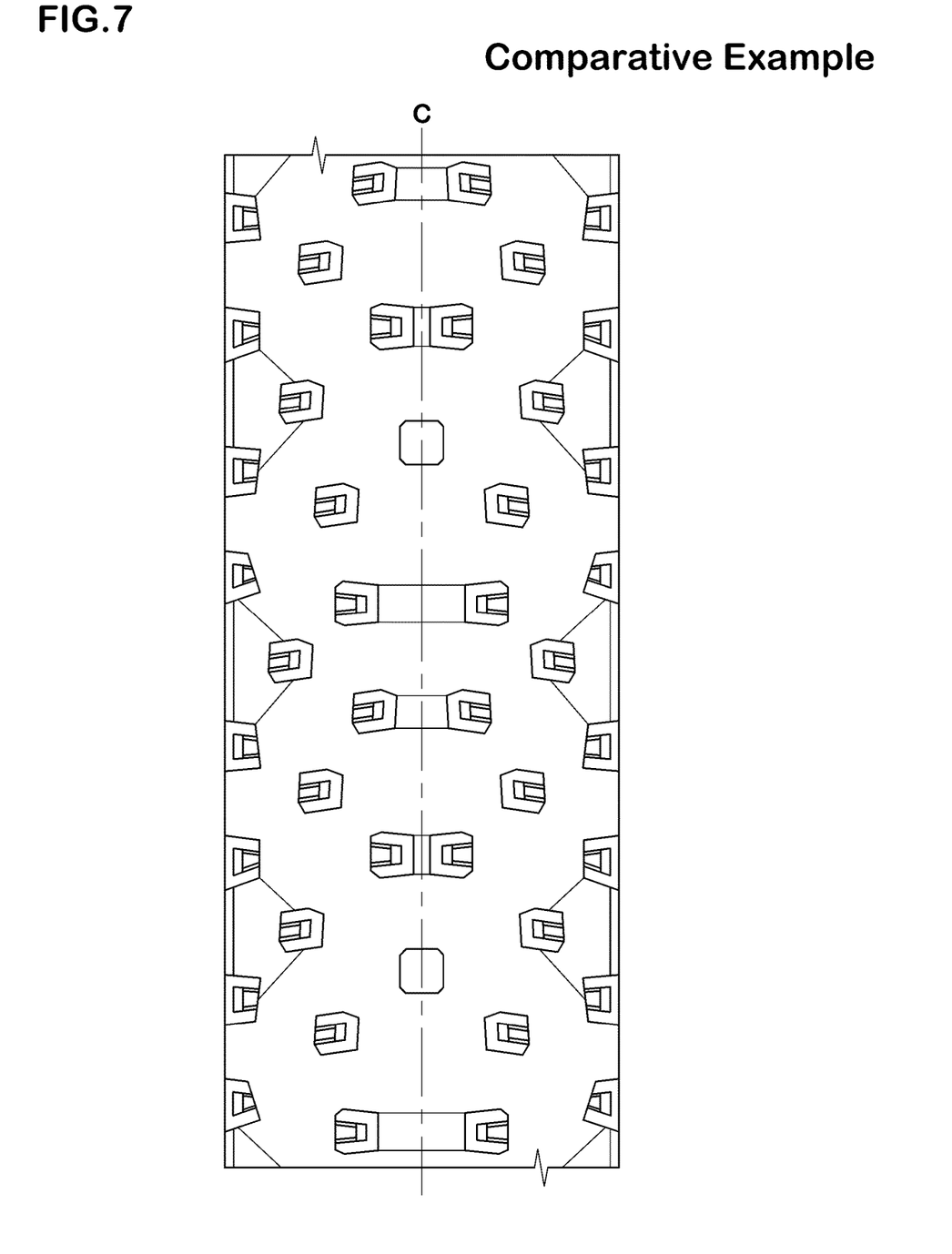
FIG. 7 is a development view of a tread portion of a motorcycle tyre for off-road according to a comparative example 1.

Motorcycle front tyres for off-road having a basic tread pattern shown in FIG. 2 were prototyped based on the specification of Table 1. As comparative example 1 (Ref. 1), as illustrated in FIG. 7, a motorcycle front tyre which includes a tread portion provided with no first connected bodies was also prototyped. Note that the tread pattern of the tyre of Ref. 1 has substantially the same block layout as one shown in FIG. 2, but is different in the layout of tie-bars from one shown in FIG. 2. Then, grip performance in muddy ground and damage on blocks of each test tyre was tested. The common specification are as follows:
- motorcycle: motocross bike with displacement of 450 cc;
- tyre size: 80/100-21;
- rim size: 21×1.60; and
- inner pressure: 80 kPa.

Test methods are as follows.

Test for Grip Performance in Muddy Ground:

A test rider rode the above-mentioned motorcycle on off-road including muddy ground, and then evaluated grip performance by the rider's sense. The test results are shown in Table 1 using a score system where Ref 1 is set to 100. The larger the value indicates the better grip performance.

Test for Damage on Blocks:

After traveling for a certain distance on off-road, damage (crack or chipping) on the blocks arranged in the crown region was checked by sight.

Table 1 shows the test results.

TABLE 1

|  | Ref. 1 | Ex. 1 | Ex. 2 | Ex. 3 | Ex. 4 | Ex. 5 | Ex. 6 | Ex. 7 |
| --- | --- | --- | --- | --- | --- | --- | --- | --- |
| Tread pattern | FIG. 7 | FIG. 2 | FIG. 2 | FIG. 2 | FIG. 2 | FIG. 2 | FIG. 2 | FIG. 2 |
| Length W1 of first connected body/tread development width TWe | — | 0.54 | 0.45 | 0.65 | 0.54 | 0.54 | 0.54 | 0.54 |
| Length W2 of first connected body/length W1 of first connected body | — | 0.95 | 0.95 | 0.95 | 0.85 | 0.90 | 1.00 | 1.05 |
| Grip performance in muddy ground (score) | 100 | 107 | 105 | 106 | 105 | 107 | 107 | 106 |
| Damage on block(s) | Occurred | None | None | None | None | None | None | None |

As shown in Table 1, it is confirmed that the tyres of examples exert superior grip performance in muddy ground. In addition, it is confirmed that the tyres of examples improve durability of blocks.

Example 2

Figure 8:
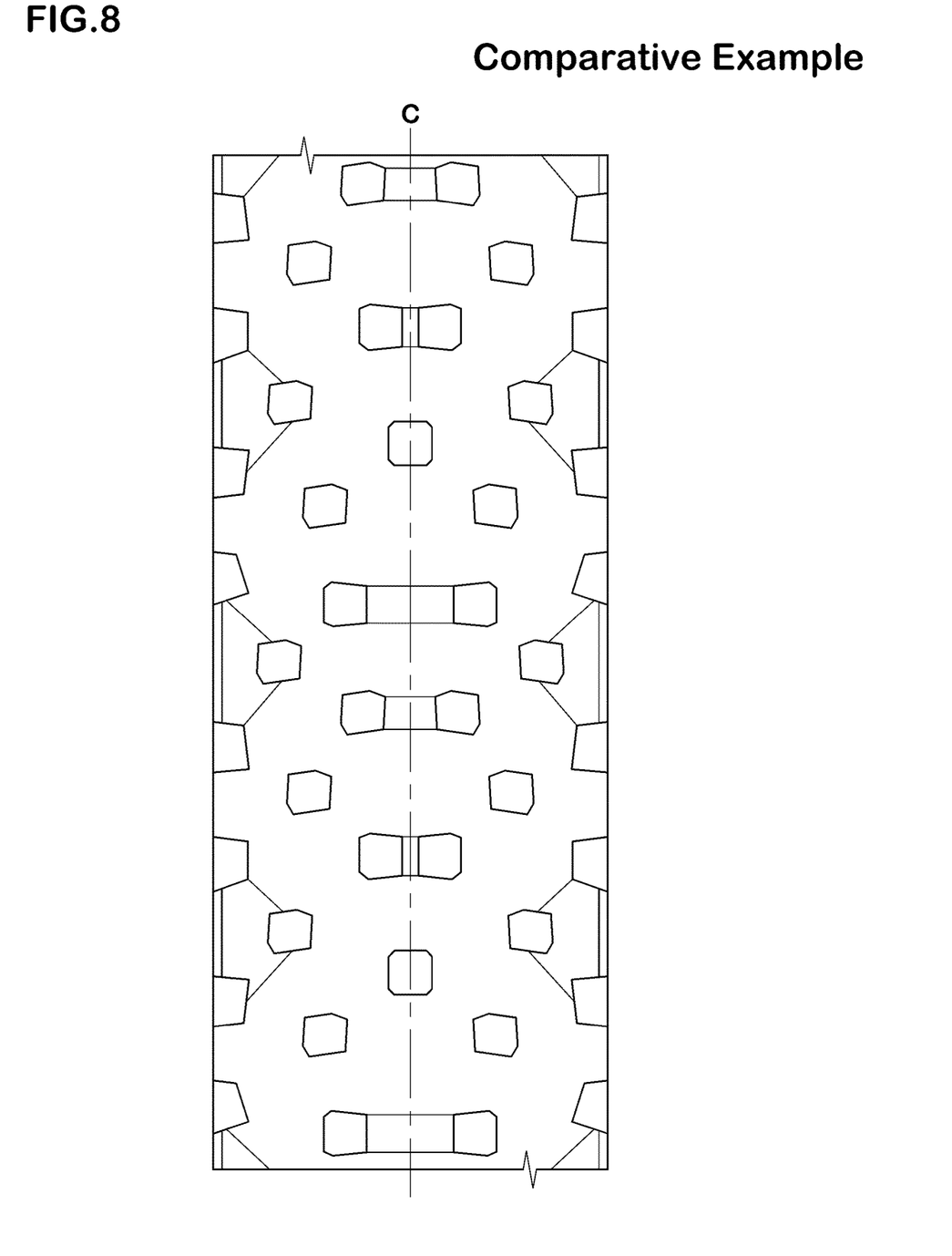
FIG. 8 is a development view of a tread portion of a motorcycle tyre for off-road according to a comparative example 2.

Motorcycle front tyres for off-road having a basic tread pattern shown in FIG. 2 were prototyped based on the specification of Table 2. As comparative example 2 (Ref. 2), as illustrated in FIG. 8, a motorcycle front tyre which includes a tread portion provided with neither first connected bodies nor grooved blocks was also prototyped. Note that the tread pattern of the tyre of Ref. 2 has substantially the same block layout as one shown in FIG. 2, but is different in the layout of tie-bars and presence of U-shaped blocks from one shown in FIG. 2. Then, grip performance in muddy ground and damage on blocks of each test tyre was tested. The common specification of test tyres and test methods are the same as described above. Note that in Table 2, the test results of "grip performance in muddy ground" are indicated using a score system where Ref. 2 is set to 100.

Table 2 shows the test results.

TABLE 2

|  | Ref. 2 | Ex. 8 | Ex. 9 | Ex. 10 | Ex. 11 | Ex. 12 | Ex. 13 | Ex. 14 | Ex. 15 | Ex. 16 |
| --- | --- | --- | --- | --- | --- | --- | --- | --- | --- | --- |
| Tread pattern | FIG. 8 | FIG. 2 | FIG. 2 | FIG. 2 | FIG. 2 | FIG. 2 | FIG. 2 | FIG. 2 | FIG. 2 | FIG. 2 |
| Area of ground contact surface of auxiliary portion/area of ground contact surface of block | — | 0.30 | 0.15 | 0.25 | 0.35 | 0.45 | 0.30 | 0.30 | 0.30 | 0.30 |

TABLE 2-continued

| | Ref. 2 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|
| Protruding height h1 of ground contact surface of auxiliary portion (mm) | — | 2.0 | 2.0 | 2.0 | 2.0 | 2.0 | 0.3 | 1.0 | 3.0 | 5.0 |
| Grip performance in muddy ground (score) | 100 | 108 | 106 | 107 | 107 | 106 | 106 | 107 | 108 | 108 |
| Damage on block(s) | Occurred | None | None | None | None | None | None | None | None | None |

As shown in Table 2, it is confirmed that the tyres of examples exert superior grip performance in muddy ground. In addition, it is confirmed that the tyres of examples improve durability of blocks.

What is claimed is:

1. A motorcycle tyre for off-road, the tyre comprising:
a tread portion comprising a bottom surface and block connected bodies;
the block connected bodies each comprising blocks protruding from the bottom surface and tie-bars protruding from the bottom surface with a height smaller than that of the blocks so as to connect the blocks with one another,
the block connected bodies comprising a first connected body whose blocks and tie-bars, in a plan view of the tread portion, are arranged so as to surround the bottom surface at least partially,
the first connected body comprising a first end block located on a first end in an extension direction of the first connected body, a second end block located on a second end in the extension direction of the first connected body, and intermediate blocks located between the first end block and the second end block,
the first end block and the second end block being adjacent with one another, and
no tie-bar connecting the first end block and the second end block being provided, wherein
an entire region of a ground contact surface of the first end block is arranged on one side with respect to a tyre equator,
an entire region of a ground contact surface of the second end block is arranged on the other side with respect to the tyre equator,
the intermediate blocks comprise a first intermediate block being adjacent to and connected to the first end block via one of the tie-bars, and a third intermediate block arranged on the tyre equator, and
a center of figure of the ground contact surface of the first intermediate block is located outwardly in the tyre axial direction with respect to a center of figure of the ground contact surface of the first end block.

2. The motorcycle tyre for off-road according to claim 1, wherein the first connected body is bent in a U-shaped manner.

3. The motorcycle tyre for off-road according to claim 1, wherein the tread portion has a designated rotation direction, and
wherein the first end block and the second end block are arranged rearwardly in the rotation direction with respect to the intermediate blocks.

4. The motorcycle tyre for off-road according to claim 3, wherein the tie-bars included in the first connected body comprises a first tie-bar having one end connected to the first end block and a second tie-bar having one end connected to the second end block, and
wherein the first tie-bar and the second tie-bar reduce in width continuously toward rearwardly in the rotation direction.

5. The motorcycle tyre for off-road according to claim 3, wherein the intermediate blocks comprise a second intermediate block adjacent to the second end block through one of the tie-bars, and
the third intermediate block is located between the first intermediate block and the second intermediate block.

6. The motorcycle tyre for off-road according to claim 5, wherein the third intermediate block is a plain block whose ground contact surface is not provided with any grooves.

7. The motorcycle tyre for off-road according to claim 5, wherein the first end block, the second end block, the first intermediate block and the second intermediate block are grooved blocks whose ground contact surfaces are provided with one or more grooves.

8. The motorcycle tyre for off-road according to claim 1, wherein the block connected bodies comprise a second connected body whose blocks and tie-bars, in a plan view of the tread portion, surround the bottom surface so as to define a closed area.

9. The motorcycle tyre for off-road according to claim 8, wherein a number of blocks included in the second connected body is from four to six.

10. The motorcycle tyre for off-road according to claim 8, wherein the second connected body is arranged on a location to cross the tyre equator.

11. The motorcycle tyre for off-road according to claim 8, wherein the second connected body further comprises two first blocks between which the tyre equator is located, and one of the tie-bars connecting the two first blocks.

12. The motorcycle tyre for off-road according to claim 11, wherein the second connected body comprises two second blocks located on a first side in a tyre circumferential direction of the first blocks and outwardly in a tyre axial direction with respect to the first blocks, and tie-bars connecting the second blocks and the first blocks.

13. The motorcycle tyre for off-road according to claim 1, wherein
the first end block and the second end block are arranged on one end side in the tyre circumferential direction of the first connected body, and
the third intermediate block is arranged on the other end side in the tyre circumferential direction of the first connected body.

14. The motorcycle tyre for off-road according to claim 1, wherein in a tread development view, the first intermediate block is arranged so as to overlap a region where the first end block is virtually expanded parallel to the tyre circumferential direction.

15. The motorcycle tyre for off-road according to claim 14, wherein in a tread development view, the first intermediate block is arranged between the first end block and the third intermediate block in the tyre circumferential direction.

16. The motorcycle tyre for off-road according to claim 1, wherein
the intermediate blocks comprise a second intermediate block being adjacent to, and connected to the second end block via one of the tie-bars, and
a center of figure of the ground contact surface of the second intermediate block is located outwardly in the tyre axial direction with respect to a center of figure of the ground contact surface of the second end block.

17. The motorcycle tyre for off-road according to claim 16, wherein in a tread development view, the second intermediate block is arranged so as to overlap a region where the second end block is virtually expanded parallel to the tyre circumferential direction.

18. The motorcycle tyre for off-road according to claim 17, wherein in a tread development view, the second intermediate block is arranged between the second end block and the third intermediate block in the tyre circumferential direction.

19. The motorcycle tyre for off-road according to claim 1, wherein
a length W1 in the tyre axial direction of the first connected body is in a range from 0.45 to 0.65 times a tread development width, and
a length W2 in the tyre circumferential direction of the first connected body is in a range from 0.90 to 1.00 times the length W1.

20. A motorcycle tyre for off-road, the tyre comprising:
a tread portion comprising a bottom surface and block connected bodies;
the block connected bodies each comprising blocks protruding from the bottom surface and tie-bars protruding from the bottom surface with a height smaller than that of the blocks so as to connect the blocks with one another,
the block connected bodies comprising a first connected body whose blocks and tie-bars, in a plan view of the tread portion, are arranged so as to surround the bottom surface at least partially,
the first connected body comprising a first end block located on a first end in an extension direction of the first connected body, a second end block located on a second end in the extension direction of the first connected body, and intermediate blocks located between the first end block and the second end block,
the first end block and the second end block being adjacent with one another, and
no tie-bar connecting the first end block and the second end block being provided, wherein
an entire region of a ground contact surface of the first end block is arranged on one side with respect to a tyre equator,
an entire region of a ground contact surface of the second end block is arranged on the other side with respect to the tyre equator,
the intermediate blocks comprise a second intermediate block being adjacent to and connected to the second end block via one of the tie-bars, and a third intermediate block arranged on the tyre equator, and
a center of figure of the ground contact surface of the second intermediate block is located outwardly in the tyre axial direction with respect to a center of figure of the ground contact surface of the second end block.

21. A motorcycle tyre for off-road, the tyre comprising:
a tread portion comprising a bottom surface and block connected bodies;
the block connected bodies each comprising blocks protruding from the bottom surface and tie-bars protruding from the bottom surface with a height smaller than that of the blocks so as to connect the blocks with one another,
the block connected bodies comprising a first connected body whose blocks and tie-bars, in a plan view of the tread portion, are arranged so as to surround the bottom surface at least partially,
the first connected body comprising a first end block located on a first end in an extension direction of the first connected body, a second end block located on a second end in the extension direction of the first connected body, and intermediate blocks located between the first end block and the second end block,
the first end block and the second end block being adjacent with one another, and
no tie-bar connecting the first end block and the second end block being provided, wherein
an entire region of a ground contact surface of the first end block is arranged on one side with respect to a tyre equator,
an entire region of a ground contact surface of the second end block is arranged on the other side with respect to the tyre equator,
the intermediate blocks comprise a third intermediate block arranged on the tyre equator,
a length W1 in the tyre axial direction of the first connected body is in a range from 0.45 to 0.65 times a tread development width, and
a length W2 in the tyre circumferential direction of the first connected body is in a range from 0.90 to 1.00 times the length W1.

\* \* \* \* \*